US012668217B2

(12) United States Patent
Onishi et al.

(10) Patent No.: US 12,668,217 B2
(45) Date of Patent: Jun. 30, 2026

(54) CHANGING A BRAKING FORCE OF A LEAN VEHICLE BASED ON A COLLISION POSSIBILITY

(71) Applicant: Robert Bosch GmbH, Stuttgart (DE)

(72) Inventors: Yoshitsuna Onishi, Kanagawa (JP); Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 18/248,155

(22) PCT Filed: Oct. 6, 2021

(86) PCT No.: PCT/IB2021/059165
§ 371 (c)(1),
(2) Date: Apr. 6, 2023

(87) PCT Pub. No.: WO2022/074581
PCT Pub. Date: Apr. 14, 2022

(65) Prior Publication Data
US 2023/0373449 A1      Nov. 23, 2023

(30) Foreign Application Priority Data

Oct. 9, 2020      (JP) ................................. 2020-171009

(51) Int. Cl.
*B60T 8/17*          (2006.01)
*B60T 8/171*        (2006.01)
*B60T 8/1755*      (2006.01)
(52) U.S. Cl.
CPC ............ *B60T 8/1706* (2013.01); *B60T 8/171* (2013.01); *B60T 8/17558* (2013.01); *B60T 2201/022* (2013.01); *B60T 2210/20* (2013.01)

(58) Field of Classification Search
CPC .... B60T 8/1706; B60T 8/171; B60T 8/17558; B60T 8/1766; B60T 2201/022; B60T 2210/20; B60T 7/22
See application file for complete search history.

(56) References Cited

U.S. PATENT DOCUMENTS

2013/0030649 A1* 1/2013 Matsuda ................... B60T 8/18
701/38
2015/0057904 A1* 2/2015 Nishimura .............. B60T 8/241
701/70
(Continued)

FOREIGN PATENT DOCUMENTS

EP          3124369 A2      2/2017
EP          3608180 A1      2/2020
(Continued)

OTHER PUBLICATIONS

Driving Tests, "Motorcycle stability control explained" (Year: 2016).*
(Continued)

*Primary Examiner* — Stephanie T Su
(74) *Attorney, Agent, or Firm* — Michael Best & Friedrich LLP

(57) ABSTRACT

The present invention provides a controller and a control method that improve safety of a lean vehicle.
The controller (60) has a control section (62) and a setting section (63). The control section (62) performs a brake control to increase a braking force of the lean vehicle (100) based on a collision possibility that is determined in response to an output result from an environment sensor (44). The setting section (63) sets a distribution of braking force between the braking force applied to a front wheel (3) and the braking force applied to a rear wheel (4) in the brake control. In the brake control, the control section (62) controls the braking force applied to the front wheel (3) and the
(Continued)

100 braking force applied to the rear wheel (4) based on the distribution of braking force set by the setting section (63).

11 Claims, 5 Drawing Sheets

(56)                    References Cited

U.S. PATENT DOCUMENTS

| | | | | |
|---|---|---|---|---|
| 2017/0330464 | A1* | 11/2017 | Yoo | B60T 7/22 |
| 2018/0362003 | A1* | 12/2018 | Ono | B62L 3/04 |
| 2020/0247374 | A1* | 8/2020 | Akahane | B60T 7/042 |
| 2022/0161788 | A1* | 5/2022 | Tamashima | B60W 30/12 |
| 2023/0219542 | A1* | 7/2023 | Yamamoto | B60W 20/14 |
| | | | | 701/70 |

FOREIGN PATENT DOCUMENTS

| | | | |
|---|---|---|---|
| EP | 3680137 | A1 | 7/2020 |
| JP | 2009116882 | A1 | 5/2009 |
| JP | 2017001636 | A | 1/2017 |
| JP | 2020015364 | A | 1/2020 |
| JP | 2020029176 | A | 2/2020 |
| WO | 2019131504 | A1 | 7/2019 |

OTHER PUBLICATIONS

International Search Report and Written Opinion for Application No. PCT/IB2021/059165 date Dec. 9, 2021 (8 pages).

* cited by examiner

[FIG. 1]
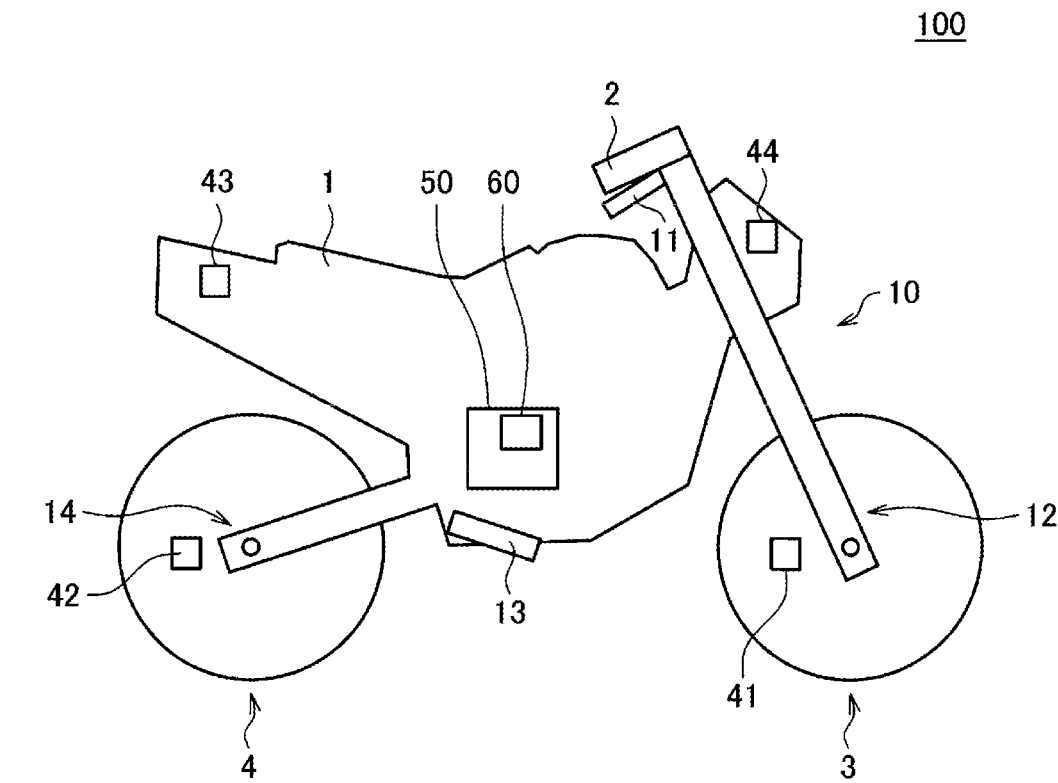

[FIG. 2]
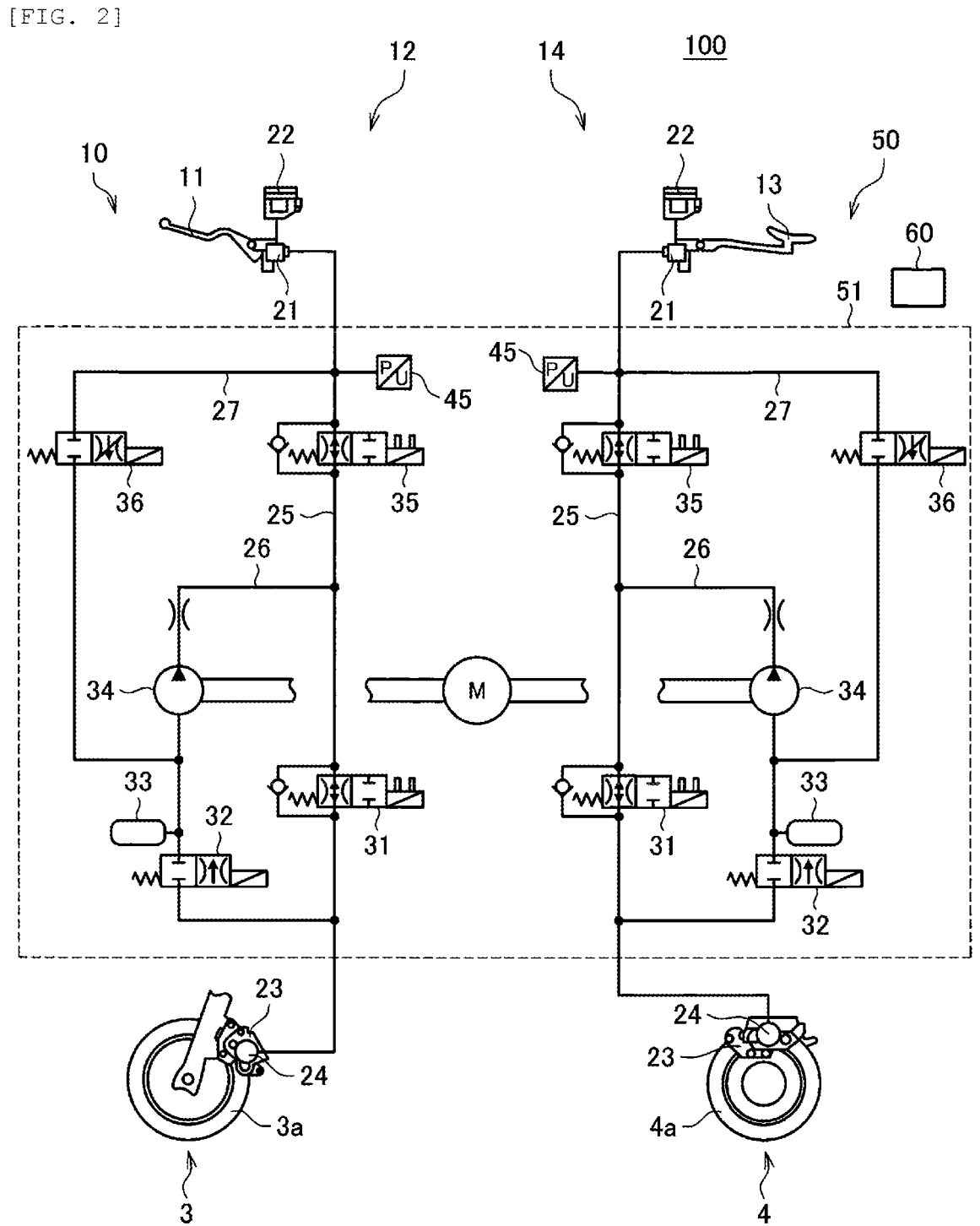

[FIG. 3]
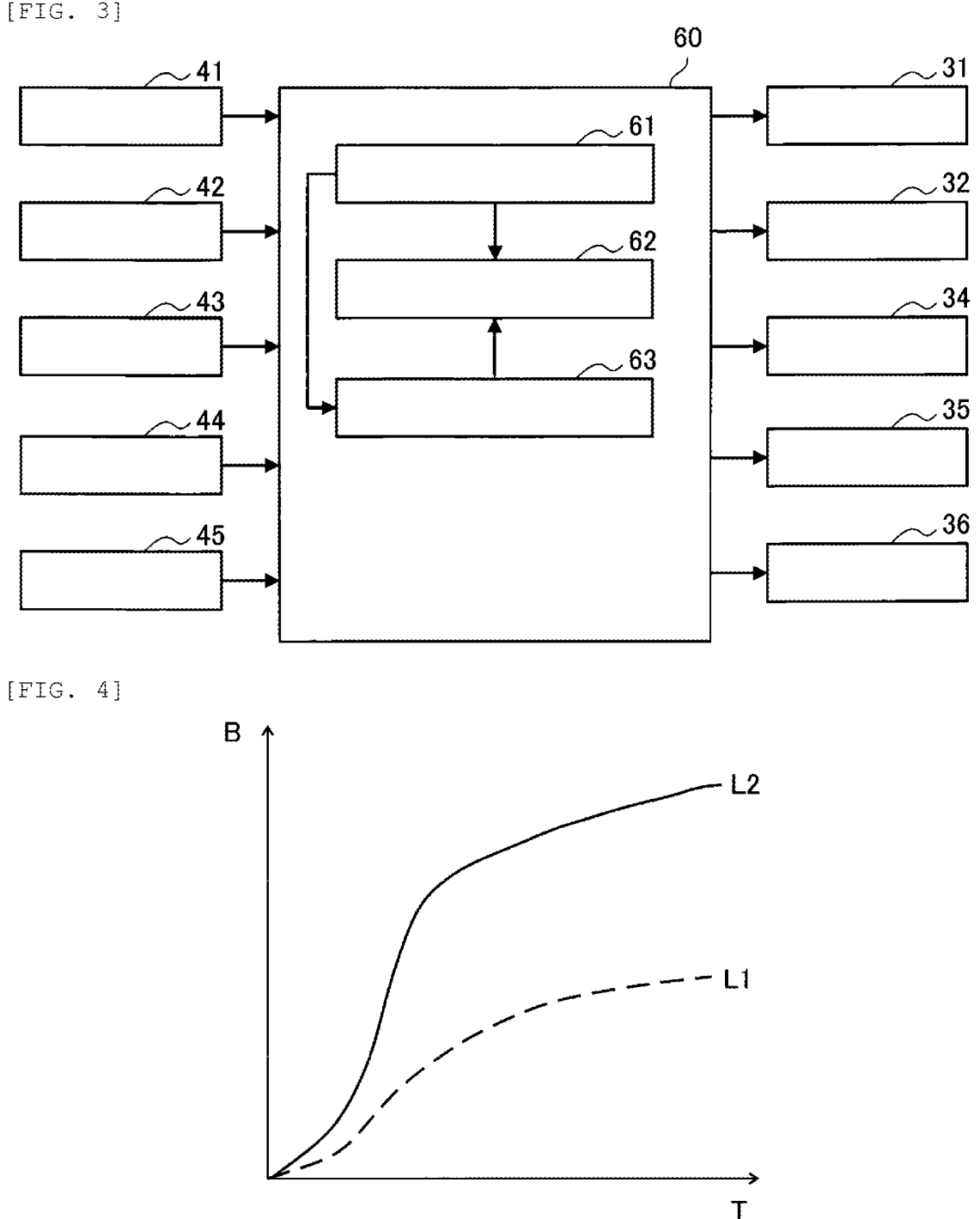
[FIG. 4]

[FIG. 5]
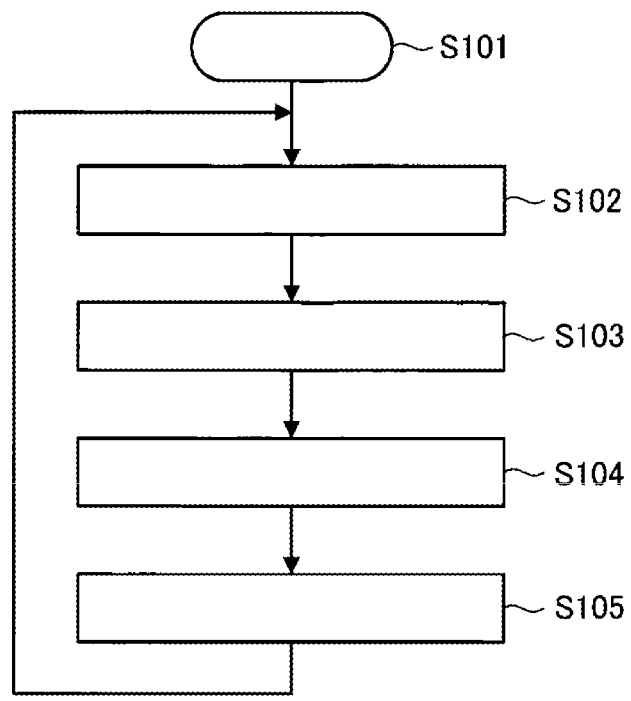
[FIG. 6]
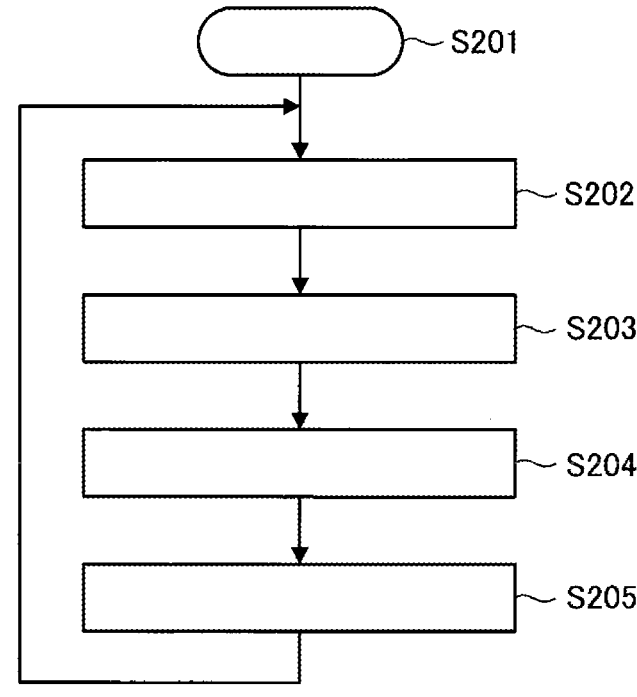

[FIG. 7]
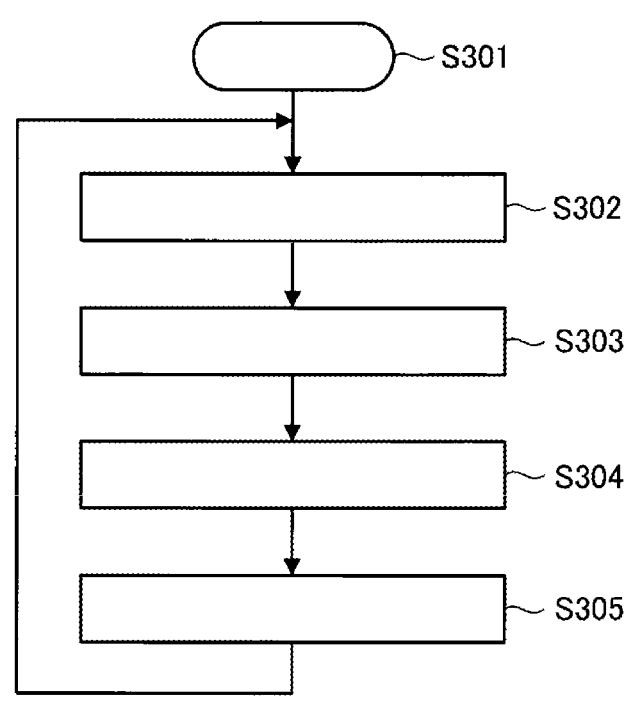

CHANGING A BRAKING FORCE OF A LEAN VEHICLE BASED ON A COLLISION POSSIBILITY

BACKGROUND OF THE INVENTION

The present disclosure relates to a controller and a control method that improve safety of a lean vehicle appropriately.

Various techniques for improving safety of lean vehicles such as a motorcycle are known.

For example, JP2009116882A discloses a driver assistance system. The driver assistance system makes a driver of a lean vehicle be informed that the lean vehicle is approaching an object inappropriately. Specifically, the driver assistance system has a sensor device that detects the object located ahead of or substantially ahead of the lean vehicle in a traveling direction. The driver assistance system provides the warning based on information detected by the sensor device.

A technique for a vehicle having four wheels is known to increase a braking force based on a collision possibility while a brake is operated so that a driver can drive the vehicle safely. Such brake control may be referred to as emergency brake assist (EBA). Here, it is considered to adopt the EBA for a lean vehicle to improve safety of the lean vehicle. However, a posture of the lean vehicle tends to be unstable as compared to a posture of the vehicle having the four wheels. As such, when the EBA increases the braking force automatically regardless of driver's operation, the lean vehicle may lose a balance. Losing the balance may results in unsafety of the driver.

SUMMARY OF THE INVENTION

The present disclosure addresses the above-described issues. Specifically, it is an objective of the present disclosure to provide a controller and a control method that improve safety of a lean vehicle appropriately.

As one aspect of the present disclosure, a controller controls behavior of a lean vehicle. The controller has a control section and a setting section. The control section performs a brake control to increase a braking force of the lean vehicle based on a collision possibility that is determined in response to an output result from an environment sensor. The setting section sets a distribution of braking force between the braking force applied to a front wheel and the braking force applied to a rear wheel during the brake control. In the brake control, the control section controls the braking force applied to the front wheel and the braking force applied to the rear wheel based on the distribution of braking force set by the setting section.

As one aspect of the present disclosure, a control method controls behavior of a lean vehicle. the control method includes: performing, with a control section, a brake control to increase a braking force applied to the lean vehicle, the control section configured to perform the brake control based on a collision possibility that is determined in response to an output result from an environment sensor; and setting, with a setting section, a distribution of braking force between the braking force applied to a front wheel and the braking force applied to a rear wheel in the brake control. In the brake control, the control section controls the braking force applied to the front wheel and the braking force applied to the rear wheel based on the distribution of braking force set by the setting section.

According to the controller and the control method of the present disclosure, the controller has a control section and a setting section. The control section performs a brake control to increase a braking force of the lean vehicle based on a collision possibility that is determined in response to an output result from an environment sensor. The setting section sets a distribution of braking force between the braking force applied to a front wheel and the braking force applied to a rear wheel during the brake control. In the brake control, the control section controls the braking force applied to the front wheel and the braking force applied to the rear wheel based on the distribution of braking force set by the setting section. Accordingly, the lean vehicle can keep a stable posture even when the brake control increases the braking force. Thus, the controller and the control method of the present disclosure can improve safety of the lean vehicle.

BRIEF DESCRIPTION OF THE DRAWINGS

FIG. 1 is a schematic view illustrating an outline configuration of a lean vehicle according to an embodiment of the present invention.

FIG. 2 is a schematic view illustrating an outline configuration of a brake system according to the embodiment of the present invention.

FIG. 3 is a block diagram illustrating an exemplary functional configuration of a controller according to the embodiment of the present invention.

FIG. 4 is a schematic graph illustrating an exemplary relationship between a braking force that corresponds to a brake control in EBA and the braking force of the lean vehicle according to the embodiment of the present invention.

FIG. 5 is a flowchart illustrating a first example of a processing procedure related to the EBA according to the embodiment of the present invention, the procedure being executed by the controller.

FIG. 6 is a flowchart illustrating a second example of the processing procedure related to the EBA according to the embodiment of the present invention, the procedure being executed by the controller.

FIG. 7 is a flowchart illustrating a third example of the processing procedure related to the EBA according to the embodiment of the present invention, the procedure being executed by the controller.

A description will hereinafter be made on a controller according to the present invention with reference to the drawings.

DETAILED DESCRIPTION

The following description will be made on the controller that is used for a two-wheeled motorcycle (see a lean vehicle 100 in FIG. 1). However, a vehicle as a control target of the controller according to the present invention only needs to be a lean vehicle that travels in a state of being tilted in a turning direction during a turn, and may be a three-wheeled motorcycle, a pedal-driven vehicle, or the like, for example. The motorcycles include: a vehicle that has an engine as a propelling source; a vehicle that has an electric motor as the propelling source; and the like, and examples of the motorcycle are a bike, a scooter, and an electric scooter. The pedal-driven vehicle means a vehicle in general that can travel forward on a road by a depression force applied to pedals by a rider. The pedal-driven vehicles include a normal pedal-driven vehicle, an electrically-assisted pedal-driven vehicle, an electric pedal-driven vehicle, and the like.

In addition, the following description will be made on a case where each of a front-wheel brake mechanism and a rear-wheel brake mechanism is provided in one unit (see a front-wheel brake mechanism 12 and a rear-wheel brake mechanism 14 in FIG. 2). However, at least one of the front-wheel brake mechanism and the rear-wheel brake mechanism may be provided in multiple units.

A configuration, action, and the like, which will be described below, merely constitute one example. The controller and a control method according to the present invention are not limited to a case with such a configuration, such action, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Lean Vehicle>

A description will be made on a configuration of the lean vehicle 100 according to an embodiment of the present invention with reference to FIG. 1 to FIG. 3.

FIG. 1 is a schematic view illustrating an outline configuration of the lean vehicle 100. FIG. 2 is a schematic view illustrating an outline configuration of a brake system 10. FIG. 3 is a block diagram illustrating an exemplary functional configuration of a controller 60.

The lean vehicle 100 is a two-wheeled motorcycle that corresponds to an example of the lean vehicle according to the present invention. As illustrated in FIG. 1, the lean vehicle 100 includes: a trunk 1; a handlebar 2 that is held by the trunk 1 in a freely turnable manner; a front wheel 3 that is held by the trunk 1 in a freely turnable manner with the handlebar 2; a rear wheel 4 that is held by the trunk 1 in a freely rotatable manner; the brake system 10; a hydraulic pressure control unit 50 that is provided to the brake system 10; and the controller (ECU) 60 that is provided to the hydraulic pressure control unit 50. The lean vehicle 100 is also provided with, as sensors, a front-wheel rotational frequency sensor 41, a rear-wheel rotational frequency sensor 42, an inertial measurement unit (IMU) 43, an environment sensor 44, and a master-cylinder pressure sensor 45 (see FIG. 2). The lean vehicle 100 includes a drive source such as an engine or a motor and travels by using power that is output from the drive source.

As illustrated in FIG. 1 and FIG. 2, the brake system 10 includes: a first brake control section 11; the front-wheel brake mechanism 12 that brakes the front wheel 3 in an interlocking manner with at least the first brake control section 11; a second brake control section 13; and the rear-wheel brake mechanism 14 that brakes the rear wheel 4 in an interlocking manner with at least the second brake control section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake control section 11 is provided to the handlebar 2 and is operated by the rider's hand. The first brake control section 11 is a brake lever, for example. The second brake control section 13 is provided to a lower portion of the trunk 1 and is operated by the rider's foot. The second brake control section 13 is a brake pedal, for example. However, like a brake control section of the scooter or the like, each of the first brake control section 11 and the second brake control section 13 may be the brake lever that is operated by the rider's hand.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided to the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Between an end on the master cylinder 21 side of the primary channel 25 and a portion of the primary channel 25 to which a downstream end of the secondary channel 26 is connected, a first valve (USV) 35 is provided. The supply channel 27 communicates between the master cylinder 21 and a portion on a suction side of the pump 34 in the secondary channel 26. A second valve (HSV) 36 is provided to the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 to which those components are provided and in which channels constituting the primary channels 25, the secondary channels 26, and the supply channels 27 are formed; and the controller 60.

The base body 51 may be formed of one member or may be formed of multiple members. In addition, in the case where the base body 51 is formed of the multiple members, the components may separately be provided to the different members.

The controller 60 controls action of each of the components in the hydraulic pressure control unit 50. As a result, the braking force generated on the front wheel 3 by the front-wheel brake mechanism 12 and the braking force generated on the rear wheel 4 by the rear-wheel brake mechanism 14 are controlled.

During a normal time (that is, when the braking force corresponding to a brake operation by the rider is set to be generated on the wheels), the controller 60 opens the inlet valves 31, closes the outlet valves 32, opens the first valves 35, and closes the second valves 36. When the first brake control section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake control section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The front-wheel rotational frequency sensor 41 is a rotational frequency sensor that detects a rotational frequency of the front wheel 3 (for example, a rotational frequency of the front wheel 3 per unit time [rpm], a travel distance of the front wheel 3 per unit time [km/h], or the like), and outputs a detection result. The front-wheel rotational frequency sensor 41 may detect another physical quantity that can substantially be converted to the rotational frequency of the front wheel 3. The front-wheel rotational frequency sensor 41 is provided to the front wheel 3.

The rear-wheel rotational frequency sensor 42 is a rotational frequency sensor that detects a rotational frequency of the rear wheel 4 (for example, the rotational frequency of the rear wheel 4 per unit time [rpm], a travel distance of the rear wheel 4 per unit time [km/h], or the like), and outputs a detection result. The rear-wheel rotational frequency sensor 42 may detect another physical quantity that can substantially be converted to the rotational frequency of the rear wheel 4. The rear-wheel rotational frequency sensor 42 is provided to the rear wheel 4.

The inertial measurement unit 43 includes a three-axis gyroscope sensor and a three-directional acceleration sensor, and detects a posture of the lean vehicle 100. For example, the inertial measurement unit 43 detects a pitching angle of the lean vehicle 100 (more specifically, a tilt angle in a pitch direction with respect to a horizontal direction in a front direction of the lean vehicle 100), and outputs a detection result. The inertial measurement unit 43 may detect another physical quantity that can substantially be converted to the pitching angle of the lean vehicle 100. In addition, for example, the inertial measurement unit 43 detects a lean angle of the lean vehicle 100 (more specifically, a tilt angle in a rolling direction with respect to a vertical direction in an upward direction of the lean vehicle 100), and outputs a detection result. The inertial measurement unit 43 may detect another physical quantity that can substantially be converted to the lean angle of the lean vehicle 100. The inertial measurement unit 43 is provided to the trunk 1, for example.

The environment sensor 44 detects environment information on environment in front of the lean vehicle 100. For example, the environment sensor 44 detects a preceding vehicle that is a vehicle located in front of the lean vehicle 100, and detects an inter-vehicular distance between the lean vehicle 100 and the preceding vehicle and a relative speed of the lean vehicle 100 to the preceding vehicle. The environment sensor 44 may detect another physical quantity that can substantially be converted to the inter-vehicular distance between the lean vehicle 100 and the preceding vehicle. In addition, the environment sensor 44 may detect another physical quantity that can substantially be converted to the relative speed of the lean vehicle 100 to the preceding vehicle. The environment sensor 44 is provided to a front portion of the trunk 1, for example. Here, the environment sensor 44 may detect, instead of the preceding vehicle, an object (for example, a road facility, a fallen object, a person, an animal, or the like) that is located in front of the lean vehicle 100, and may detect an inter-vehicular distance between the lean vehicle 100 and the object and a relative speed of the lean vehicle 100 to the object.

As the environment sensor 44, for example, a camera that captures an image in front of the lean vehicle 100 and a radar that can detect a distance from the lean vehicle 100 to a target in front are used. When the preceding vehicle is detected by using the image captured by the camera and the detection result of the preceding vehicle and a detection result by the radar are used, it is possible to detect the inter-vehicular distance between the lean vehicle 100 and the preceding vehicle and the relative speed of the lean vehicle 100 to the preceding vehicle. The configuration of the environment sensor 44 is not limited to that in the above example. For example, a stereo camera may be used as the environment sensor 44.

The master-cylinder pressure sensor 45 detects the brake hydraulic pressure in the master cylinder 21 (that is, a master cylinder pressure), and outputs a detection result. The master-cylinder pressure sensor 45 may detect another physical quantity that can substantially be converted to the master cylinder pressure. More specifically, the master-cylinder pressure sensor 45 is provided to each of the front-wheel brake mechanism 12 and the rear-wheel brake mechanism 14. In this way, the master cylinder pressure of the master cylinder 21 attached to the first brake control section 11 and the master cylinder pressure of the master cylinder 21 attached to the second brake control section 13 are separately detected.

The controller 60 controls behavior of the lean vehicle 100. For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 3, the controller 60 includes an acquisition section 61, a control section 62, and a setting section 63, for example.

The acquisition section 61 acquires information from each of the devices mounted to the lean vehicle 100, and outputs the acquired information to the control section 62. For example, the acquisition section 61 acquires information from the front-wheel rotational frequency sensor 41, the rear-wheel rotational frequency sensor 42, the inertial measurement unit 43, the environment sensor 44, and the master-cylinder pressure sensor 45.

In order to control the behavior of the lean vehicle 100, the control section 62 executes braking control (that is, control of the braking force generated on the lean vehicle 100). More specifically, in the braking control, the control section 62 controls the action of each of the components of the hydraulic pressure control unit 50 in the brake system 10.

As described above, during the normal time, the control section 62 controls the action of each of the components in the hydraulic pressure control unit 50 such that the braking force corresponding to the brake operation by the rider is generated on the wheels. Meanwhile, in a particular case, the control section 62 executes different braking control from that during the normal time.

For example, in the case where the wheel is locked or possibly locked, the control section 62 executes anti-lock brake control. In the anti-lock brake control, the braking force of the wheel is adjusted to such a braking force with which locking of the wheel can be avoided.

During execution of the anti-lock brake control, the control section 62 brings the lean vehicle 100 into a state where the inlet valve 31 is closed, the outlet valve 32 is opened, the first valve 35 is opened, and the second valve 36 is closed, and drives the pump 34 in such a state, so as to reduce the hydraulic pressure of the brake fluid in the wheel cylinder 24 and thereby reduce the braking force generated on the wheel. Then, the control section 62 closes both of the inlet valve 31 and the outlet valve 32 from the above state, so as to keep the hydraulic pressure of the brake fluid in the wheel cylinder 24 and keep the braking force generated on the wheel. Thereafter, the control section 62 opens the inlet valve 31 and closes the outlet valve 32, so as to increase the hydraulic pressure of the brake fluid in the wheel cylinder 24 and thereby increasing the braking force applied to the wheel.

During the execution of the anti-lock brake control, the above control for reducing the braking force generated on the wheel (that is, braking force reduction control), the above control for keeping the braking force generated on the wheel (that is, braking force keeping control), and the above control for increasing the braking force generated on the wheel (that is, braking force increase control) are repeatedly executed in this order.

Here, in the case where a collision possibility with the preceding vehicle exceeds a reference in a situation where the brake operation is performed by the rider of the lean vehicle 100, the control section 62 performs a brake control referred to as an emergency brake assist (EBA). The EBA increases the braking force of the lean vehicle 100. Increasing the braking force of the lean vehicle 100 may mean increasing the braking force of the lean vehicle 100 to be larger than the braking force that corresponds to the brake operation. In the EBA, the braking force of the lean vehicle 100 is adjusted to such a magnitude of the braking force that can improve avoidability of the collision with the preceding vehicle.

The collision possibility is acquired based on an output result of the environment sensor 44. For example, based on the inter-vehicular distance between the lean vehicle 100 and the preceding vehicle and the relative speed of the lean vehicle 100 to the preceding vehicle, the control section 62 determines whether the collision possibility with the preceding vehicle exceeds the reference. For example, in the case where duration before reaching the preceding vehicle, which is determined from the inter-vehicular distance and the relative speed, is excessively short, the control section 62 determines that the collision possibility with the preceding vehicle exceeds the reference, and initiates the EBA.

During actuation of the EBA, the control section 62 brings the lean vehicle 100 into a state where the inlet valve 31 is opened, the outlet valve 32 is closed, the first valve 35 is closed, and the second valve 36 is opened, and drives the pump 34, so as to increase the hydraulic pressure of the brake fluid in the wheel cylinder 24. In this way, it is possible to increase the braking force generated on the wheel to be larger than the braking force that corresponds to the brake operation. That is, it is possible to increase the braking force on the lean vehicle 100. In the EBA, the control section 62 separately controls the front-wheel brake mechanism 12 and the rear-wheel brake mechanism 14, and can thereby separately control the braking force on the front wheel 3 and the braking force on the rear wheel 4.

The setting section 63 sets a distribution of braking force between the braking force applied to the front wheel 3 by the EBA and the braking force applied to the rear wheel 4 by the EBA. Setting of the distribution of braking force by the setting section 63 means to set a magnitude of the braking force for each of a target value of the braking force on the front wheel 3 and a target value of the braking force on the rear wheel 4.

As described above, in the controller 60, the setting section 63 sets the distribution of braking force between the braking force applied to the front wheel 3 by the EBA and the braking force applied to the rear wheel 4 by the EBA. Then, in the EBA, the control section 62 controls the braking forces on the front wheel 3 and the rear wheel 4 based on the setting of the distribution of braking force by the setting section 63. In this way, safety of the lean vehicle 100 is appropriately improved. A detailed description will be made below on such processing related to the EBA and executed by the controller 60.

<Action of Controller>

A description will be made on action of the controller 60 according to the embodiment of the present invention with reference to FIG. 4 to FIG. 7.

As described above, in this embodiment, the control section 62 performs the EBA according to the collision possibility in the situation where the brake operation is performed by the rider of the lean vehicle 100.

FIG. 4 is a schematic graph illustrating an exemplary relationship between the braking force that corresponds to the brake control in the EBA and the braking force of the lean vehicle 100. In FIG. 4, a horizontal axis T represents time, and a vertical axis B represents the braking force. In addition, in FIG. 4, a broken line L1 represents the braking force that corresponds to the brake operation, and a solid line L2 represents the braking force of the lean vehicle 100.

As illustrated in FIG. 4, in the EBA, the braking force of the lean vehicle 100 represented by the solid line L2 is controlled to be larger than the braking force corresponding to the brake operation and represented by the broken line L1. That is, the braking force of the lean vehicle 100 is increased. In this way, the avoidability of the collision with the preceding vehicle is improved.

Here, in the EBA, in the case where the distribution of braking force between the braking force applied to the front wheel 3 and the braking force applied to the rear wheel 4 is set inappropriately, the posture of the lean vehicle 100 may becomes unstable. For example, in the case where the majority of the braking force of the lean vehicle 100 is applied to the front wheel 3 and thus the braking force on the rear wheel 4 is excessively small, a load on the rear wheel 4 is extremely small. In this case, as a result of a friction circle of the rear wheel 4 becoming excessively small, the rear wheel 4 is likely to be locked, which makes the posture of the lean vehicle 100 unstable.

In view of the above, in this embodiment, in order to suppress the posture of the lean vehicle 100 from becoming unstable, the setting section 63 in the controller 60 sets the distribution of braking force between the braking force applied to the front wheel 3 by the EBA and the braking force applied to the rear wheel 4 by the EBA. As a result, in the EBA, it is possible to make the distribution of braking force between the braking force applied to the front wheel 3 and the braking force applied to the rear wheel 4 appropriate and, for example, to suppress the braking force on the rear wheel 4 from becoming excessively small. Therefore, it is possible to suppress the posture of the lean vehicle 100 from becoming unstable due to the increase of the braking force by the EBA. A description will hereinafter be made on a first example, a second example, and a third example of such a processing procedure related to the EBA and executed by the controller 60 in this order.

FIG. 5 is a flowchart illustrating the first example of the processing procedure related to the EBA and executed by the controller 60. A control flow illustrated in FIG. 5 is initiated when an initiation condition of the EBA (that is, a condition that the collision possibility with the preceding vehicle exceeds the reference) is satisfied. Step S101 in FIG. 5 corresponds to the initiation of the control flow illustrated in FIG. 5. In the control flow illustrated in FIG. 5, processing at steps S102 to S105 corresponds to a single calculation cycle, and each calculation cycle is repeated at specified time intervals. However, in the case where a termination condition of the EBA is satisfied in the middle of the control flow illustrated in FIG. 5, the control flow illustrated in FIG. 5 is terminated. As the termination condition of the EBA, for example, a condition that the brake operation by the rider is canceled can be used.

When the control flow illustrated in FIG. 5 is initiated, at step S102, the setting section 63 determines a target braking force (that is, the target value of the braking force) of the lean vehicle 100 in the current calculation cycle.

The setting section 63 sets, as the target braking force, such a magnitude of the braking force that can improve the avoidability of the collision with the preceding vehicle. For example, the setting section 63 determines the target braking force based on the inter-vehicular distance between the lean vehicle 100 and the preceding vehicle and the relative speed of the lean vehicle 100 to the preceding vehicle.

Next, at step S103, the setting section 63 sets a target ratio of the braking force (that is, a target value of a ratio of the braking force) between the front wheel 3 and the rear wheel 4. More specifically, as will be described below, the setting section 63 sets the target ratio based on various parameters. Here, the target ratio can include such a ratio that the front wheel 3 is 100% and the rear wheel 4 is 0% and such a ratio that the front wheel 3 is 0% and the rear wheel 4 is 100%. In addition, the target ratio may be a fixed value that is set in advance. In such a case, the processing at step S103 can be omitted.

Next, at step S104, the setting section 63 distributes the target braking force of the lean vehicle 100 to the front wheel 3 and the rear wheel 4 at the target ratio. That is, in this case, the target braking force on the front wheel 3 and the target braking force on the rear wheel 4 are set such that the braking force corresponding to the target braking force of the lean vehicle 100 is generated on the entire lean vehicle 100.

Next, at step S105, the control section 62 controls the braking forces on the front wheel 3 and the rear wheel 4 based on the setting of the distribution of braking force between the braking force applied to the front wheel 3 and the braking force applied to the rear wheel 4 by the setting section 63. More specifically, the control section 62 controls the braking force on the front wheel 3 to become the target braking force on the front wheel 3, which is set by the setting section 63, and controls the braking force on the rear wheel 4 to become the target braking force on the rear wheel 4, which is set by the setting section 63.

After step S105, the processing returns to step S102, and the next calculation cycle is performed.

As described above, in the control flow illustrated in FIG. 5, the setting section 63 distributes the target braking force of the lean vehicle 100 to the front wheel 3 and the rear wheel 4 at the target ratio in the EBA. Here, the setting section 63 may set the distribution of braking force between the braking force applied to the front wheel 3 and the braking force applied to the rear wheel 4 in the EBA based on the various parameters. For example, in the control flow illustrated in FIG. 5, the setting section 63 may set the target ratio based on the various parameters.

For example, the setting section 63 may set the target ratio based on posture information of the lean vehicle 100. The posture information is information on a physical quantity that is reflected to the posture of the lean vehicle 100.

For example, the posture information includes pitching angle information of the lean vehicle 100. The pitching angle information is information on the pitching angle of the lean vehicle 100 and can include, for example, information indicative of the pitching angle or information indicative of a pitching angular velocity (that is, a time rate of change of the pitching angle).

Here, the pitching angle may be a positive value when a front portion of the lean vehicle 100 is tilted upward (that is, when the front direction of the lean vehicle 100 is tilted upward with respect to the horizontal direction). For example, when the pitching angle or the pitching angular velocity has a negative value, the setting section 63 sets the target ratio such that the braking force applied to the rear wheel 4 is increased and the ratio of the braking force applied to the front wheel 3 is reduced as an absolute value of the pitching angle or the pitching angular velocity rises.

As the braking force applied to the front wheel 3 is increased, a force that is generated by the braking force on the front wheel 3 to push down the front portion of the lean vehicle 100 can be increased. Meanwhile, as the braking force applied to the rear wheel 4 is increased, a force that is generated by the braking force applied to the rear wheel 4 to push down a rear portion of the lean vehicle 100 can be increased. Thus, when the target ratio is set based on the pitching angle or the pitching angular velocity as described above, it is possible to stabilize the posture of the lean vehicle 100 in the pitch direction. For example, in the case where the pitching angle has the negative value and the absolute value of the pitching angle is excessively large, it is possible to suppress rear lift-up, which is lifting of the rear portion of the lean vehicle 100, by increasing the braking force on the rear wheel 4. Meanwhile, in the case where the pitching angle has the negative value and the absolute value of the pitching angle is not excessively large, it is possible to improve braking performance by increasing the braking force on the front wheel 3.

For example, the posture information includes lean angle information of the lean vehicle 100. The lean angle information is information on the lean angle of the lean vehicle 100 and can include, for example, information indicative of the lean angle or information indicative of a lean angular velocity (that is, a time rate of change of the lean angle).

For example, the setting section 63 sets the target ratio such that the ratio of the braking force applied to the rear wheel 4 is increased and the ratio of the braking force applied to the front wheel 3 is reduced as an absolute value of the lean angle or an absolute value of the lean angular velocity of the lean vehicle 100 rises. Here, even in the case where such a circumstance occurs that grip of the rear wheel 4 is lost, as the braking force applied to the rear wheel 4 is increased, it becomes easy for the rider to bring the lean vehicle 100 back into an upright position in the rolling direction. That is, the rider can easily change the posture of the lean vehicle 100 in the rolling direction. Thus, when the target ratio is set based on the lean angle information as described above, it is possible to stabilize the posture of the lean vehicle 100 in the rolling direction.

For example, the posture information includes acceleration/deceleration information of the lean vehicle 100. The acceleration/deceleration information is information on acceleration/deceleration of the lean vehicle 100. For example, the setting section 63 can acquire the acceleration/deceleration information based on the rotational frequency of the front wheel 3 and the rotational frequency of the rear wheel 4.

For example, the setting section 63 sets the target ratio such that the ratio of the braking force applied to the rear wheel 4 is increased and the ratio of the braking force applied to the front wheel 3 is reduced as a degree of the deceleration of the lean vehicle 100 rises immediately before the initiation of the EBA. Here, there is a situation where the degree of the deceleration of the lean vehicle 100 is excessively high immediately before the initiation of the EBA. In such a situation, the braking force applied to the front wheel 3 may cause an excessively large force that pushes down the front portion of the lean vehicle 100. Thus, when the target ratio is set based on the acceleration/deceleration information as described above, it is possible to suppress the rear lift-up and thus to stabilize the posture of the lean vehicle 100. Meanwhile, in the case where the deceleration of the lean vehicle 100 is not excessively high immediately before the initiation of the EBA, it is possible to improve the braking performance by increasing the braking force on the front wheel 3.

For example, the setting section 63 may set the target ratio based on an operation amount of the brake operation by the rider. The operation amount of the brake operation is an index indicative of an operation amount of the brake control section (more specifically, the first brake control section 11 or the second brake control section 13). For example, the operation amount related to the first brake control section 11 may be the master cylinder pressure of the master cylinder 21, which is attached to the first brake control section 11, or may be the operation amount itself of the first brake control section 11 (that is, a brake control amount). In addition, for example, the operation amount related to the second brake control section 13 may be the master cylinder pressure of the master cylinder 21, which is attached to the second brake control section 13, or may be the operation amount itself of the second brake control section 13 (that is, the brake control amount).

For example, the setting section 63 may set the target ratio such that the ratio of the front wheel 3 is reduced and the ratio of the rear wheel 4 is increased as a ratio of the operation amount of the first brake control section 11 to the operation amount of the second brake control section 13 is reduced. Here, in the case where the operation amount of the first brake control section 11 is small and the braking force on the front wheel 3 is rapidly increased by the EBA, the behavior of the lean vehicle 100 becomes such behavior that contradicts behavior intended by the rider. In addition, in the case where the operation amount of the second brake control section 13 is small and the braking force on the rear wheel 4 is rapidly increased by the EBA, the behavior of the lean vehicle 100 becomes such behavior that contradicts the behavior intended by the rider. In view of the above, when the target ratio is set based on the operation amount of the brake operation by the rider as described above, it is possible to suppress the lean vehicle 100 from exhibiting, by the EBA, such behavior that contradicts the behavior intended by the rider.

For example, the setting section 63 may set the target ratio based on a degree of slope of a road along which the lean vehicle 100 is traveling. For example, the setting section 63 can determine the degree of slope of the road along which the lean vehicle 100 is traveling based on the pitching angle of the lean vehicle 100.

For example, in the case where the road along which the lean vehicle 100 is traveling is an uphill road, the setting section 63 sets the target ratio such that the ratio of the front wheel 3 is increased and the ratio of the rear wheel 4 is reduced in comparison with a case where the road along which the lean vehicle 100 is traveling is a downhill road. As described above, as the braking force applied to the front wheel 3 is increased, the force, which is generated by the braking force applied to the front wheel 3 and which pushes down the front portion of the lean vehicle 100, can be increased. Meanwhile, as the braking force applied to the rear wheel 4 is increased, the force, which is generated by the braking force on the rear wheel 4 and which pushes down the rear portion of the lean vehicle 100, can be increased. Thus, when the target ratio is set based on the degree of slope of the road along which the lean vehicle 100 is traveling as described above, it is possible to stabilize the posture of the lean vehicle 100 in the pitch direction. For example, in the case where the road along which the lean vehicle 100 is traveling is the uphill road, it is possible to suppress such a change of the posture of the lean vehicle 100 that the front portion of the lean vehicle 100 is further tilted upward. In addition, for example, in the case where the road along which the lean vehicle 100 is traveling is the downhill road, it is possible to suppress such a change of the posture of the lean vehicle 100 that the rear portion of the lean vehicle 100 is further tilted upward.

FIG. 6 is a flowchart illustrating the second example of the processing procedure related to the EBA and executed by the controller 60. A control flow illustrated in FIG. 6 is initiated when the initiation condition of the EBA is satisfied. Step S201 in FIG. 6 corresponds to the initiation of the control flow illustrated in FIG. 6. In the control flow illustrated in FIG. 6, processing at steps S202 to S205 corresponds to the single calculation cycle, and each calculation cycle is repeated at the specified time intervals. Similar to the control flow illustrated in FIG. 5, in the case where the termination condition of the EBA is satisfied in the middle of the control flow illustrated in FIG. 6, the control flow illustrated in FIG. 6 is terminated.

When the control flow illustrated in FIG. 6 is initiated, at step S202, the setting section 63 determines the target braking force of the lean vehicle 100 in the current calculation cycle. The processing at step S202 is the same as that at step S102 illustrated in FIG. 5.

Next, at step S203, the setting section 63 sets the target ratio of the braking force between the front wheel 3 and the rear wheel 4. The processing at step S203 is the same as that at step S103 illustrated in FIG. 5.

Next, at step S204, the setting section 63 sets the distribution of braking force between the braking force applied to the front wheel 3 and the braking force applied to the rear wheel 4 such that the braking force applied to the front wheel 3 becomes the target braking force of the lean vehicle 100 and that the ratio of the braking force between the braking force applied to the front wheel 3 and the braking force applied to the rear wheel 4 becomes the target ratio. That is, in this case, the target braking force on the front wheel 3 and the target braking force on the rear wheel 4 are set such that the braking force equal to or larger than the target braking force of the lean vehicle 100 is generated on the entire lean vehicle 100.

Next, at step S205, the control section 62 controls the braking forces on the front wheel 3 and the rear wheel 4 based on the setting of the distribution of braking force between the braking force applied to the front wheel 3 and the braking force applied to the rear wheel 4 by the setting section 63. The processing at step S205 is the same as that at step S105 illustrated in FIG. 5.

After step S205, the processing returns to step S202, and the next calculation cycle is performed.

As described above, in the control flow illustrated in FIG. 6, in the EBA, the setting section 63 sets the distribution of braking force between the braking force applied to the front wheel 3 and the braking force applied to the rear wheel 4 such that the braking force on the front wheel 3 becomes the target braking force of the lean vehicle 100 and that the ratio of the braking force between the braking force applied to the front wheel 3 and the braking force applied to the rear wheel 4 becomes the target ratio. Here, the setting section 63 may set the distribution of braking force between the braking force applied to the front wheel 3 and the braking force applied to the rear wheel 4 in the EBA based on the various parameters. For example, in the control flow illustrated in FIG. 6, the setting section 63 may set the target ratio based on the various parameters. Similar to the above-described control flow illustrated in FIG. 5, also in the control flow illustrated in FIG. 6, for example, the setting section 63 may set the target ratio based on the posture information of the lean vehicle 100, the operation amount of the brake operation, the degree of slope of the road along which the lean vehicle 100 is traveling, or the like.

FIG. 7 is a flowchart illustrating the third example of the processing procedure related to the EBA and executed by the controller 60. A control flow illustrated in FIG. 7 is initiated when the initiation condition of the EBA is satisfied. Step S301 in FIG. 7 corresponds to the initiation of the control flow illustrated in FIG. 7. In the control flow illustrated in FIG. 7, processing at steps S302 to S305 corresponds to the single calculation cycle, and each calculation cycle is repeated at the specified time intervals. Similar to the control flow illustrated in FIG. 5 or FIG. 6, in the case where the termination condition of the EBA is satisfied in the middle of the control flow illustrated in FIG. 7, the control flow illustrated in FIG. 7 is terminated.

When the control flow illustrated in FIG. 7 is initiated at step S302, the setting section 63 determines the target braking force of the lean vehicle 100 in the current calculation cycle. The processing at step S302 is the same as that at step S102 illustrated in FIG. 5.

Next, at step S303, the setting section 63 sets an increased braking force which is to be applied to the front wheel 3. For example, the setting section 63 considers an upper limit value of the braking force applied to the front wheel 3 when setting the increased braking force which is to be applied to the front wheel 3. The upper limit value of the braking force on the front wheel 3 is a value that is set in advance based on specifications and the like of the lean vehicle 100, and is a maximum value of the braking force that can be generated on the front wheel 3.

For example, there is a case where the braking force applied to the front wheel 3 alone covers the target braking force. That is the target braking force of the lean vehicle 100 is equal to or smaller than the upper limit value of the braking force which can be applied to the front wheel 3. In such a case, the setting section 63 sets the increased braking force on the front wheel 3 to be the target braking force of the lean vehicle 100. On the other hand, for example, there is a case where the braking force applied to the front wheel 3 is insufficient for the target braking force. That is, the target braking force of the lean vehicle 100 is larger than the upper limit value of the braking force which can be applied to the front wheel 3. In such a case, the setting section 63 sets the increased braking force on the front wheel 3 to be the upper limit value of the braking force on the front wheel 3.

Next, at step S304, the setting section 63 sets an adjusted braking force which is to be applied to the rear wheel 4 based on a magnitude relationship between the increased braking force on the front wheel 3 and the target braking force of the lean vehicle 100.

For example, there is a case where the increased braking force on the front wheel 3 is smaller than the target braking force of the lean vehicle 100. That is, the increased braking force on the front wheel 3 alone does not cover the target braking force. In such a case, the setting section 63 sets the adjusted braking force on the rear wheel 4 to be an amount of difference between the target braking force of the lean vehicle 100 and the increased braking force on the front wheel 3. On the other hand, there is a case where the increased braking force on the front wheel 3 is equal to the target braking force of the lean vehicle 100. That is, the increased braking force on the front wheel 3 alone covers the target braking force. In such a case, for example, the setting section 63 sets the adjusted braking force on the rear wheel 4 to be the braking force that corresponds to the operation amount of the second brake control section 13. That is, in this case, the braking force which is to be applied to the rear wheel 4 is not increased.

Next, at step S305, the control section 62 controls the braking forces on the front wheel 3 and the rear wheel 4 based on the setting of the distribution of braking force between the braking force applied to the front wheel 3 and the braking force applied to the rear wheel 4 by the setting section 63. The processing at step S305 is the same as that at step S105 illustrated in FIG. 5.

After step S305, the processing returns to step S302, and the next calculation cycle is performed.

As described above, in the control flow illustrated in FIG. 7, the setting section 63 sets the adjusted braking force which is to be applied to the rear wheel 4 based on the magnitude relationship between the increased braking force on the front wheel 3 and the target braking force of the lean vehicle 100 in the EBA. In this way, it is possible to set the distribution of braking force between the braking force applied to the front wheel 3 and the braking force applied to the rear wheel 4 in the EBA in a manner to make maximum use of the braking force on the front wheel 3, which is mainly used for braking of the lean vehicle 100.

Here, the setting section 63 may set the distribution of braking force between the braking force applied to the front wheel 3 and the braking force applied to the rear wheel 4 in the EBA based on the various parameters. For example, in the control flow illustrated in FIG. 7, the setting section 63 may adjust the ratio of the braking force between the front wheel 3 and the rear wheel 4, which is determined at step S304, based on the various parameters. Similar to the above-described control flow illustrated in FIG. 5, also in the control flow illustrated in FIG. 7, for example, the setting section 63 may adjust the ratio of the braking force between the front wheel 3 and the rear wheel 4, which is determined at step S304, based on the posture information of the lean vehicle 100, the operation amount of the brake operation, the degree of slope of the road along which the lean vehicle 100 is traveling, or the like.

<Effects of Controller>

A description will be made on effects of the controller 60 according to the embodiment of the present invention.

In the controller 60, the setting section 63 sets the distribution of braking force between the braking force applied to the front wheel 3 and the braking force applied to the rear wheel 4 in the EBA. Then, in the EBA, the control section 62 controls the braking forces on the front wheel 3 and the rear wheel 4 based on the setting of the distribution of braking force by the setting section 63. As a result, in the EBA, it is possible to make the distribution of braking force between the braking force applied to the front wheel 3 and the braking force applied to the rear wheel 4 appropriate and, for example, to suppress the braking force on the rear wheel 4 from becoming excessively small. Thus, it is possible to suppress the posture of the lean vehicle 100 from becoming unstable due to the increase of the braking force by the EBA. Therefore, it is possible to appropriately improve the safety of the lean vehicle 100.

Preferably, in the controller 60, the setting section 63 sets the distribution of braking force between the braking force applied to the front wheel 3 and the braking force applied to the rear wheel 4 based on the posture information of the lean vehicle 100. In this way, in the EBA, it is possible to make the distribution of braking force between the braking force applied to the front wheel 3 and the braking force applied to the rear wheel 4 appropriate based on the posture informa-tion of the lean vehicle 100. Thus, it is possible to further appropriately suppress the posture of the lean vehicle 100 from becoming unstable due to the increase of the braking force by the EBA. Therefore, it is possible to further appropriately improve the safety of the lean vehicle 100.

Preferably, in the controller 60, the posture information includes the pitching angle information of the lean vehicle 100. In this way, in the EBA, it is possible to make the distribution of braking force between the braking force applied to the front wheel 3 and the braking force applied to the rear wheel 4 appropriate based on the pitching angle information of the lean vehicle 100. Therefore, it is possible to stabilize the posture of the lean vehicle 100 in the pitch direction.

Preferably in the controller 60, the posture information includes the lean angle information of the lean vehicle 100. In this way, in the EBA, it is possible to make the distribu-tion of braking force between the braking force applied to the front wheel 3 and the braking force applied to the rear wheel 4 appropriate based on the lean angle information of the lean vehicle 100. Therefore, it is possible to stabilize the posture of the lean vehicle 100 in the rolling direction.

Preferably, in the controller 60, the posture information includes the acceleration/deceleration information of the lean vehicle 100. In this way, in the EBA, it is possible to make the distribution of braking force between the braking force applied to the front wheel 3 and the braking force applied to the rear wheel 4 appropriate based on the accel-eration/deceleration information of the lean vehicle 100. Therefore, it is possible to stabilize the posture of the lean vehicle 100.

Preferably, in the controller 60, the setting section 63 sets the distribution of braking force between the braking force applied to the front wheel 3 and the braking force applied to the rear wheel 4 based on the operation amount of the brake operation by the rider. In this way, it is possible to suppress the lean vehicle 100 from exhibiting, by the EBA, such behavior that contradicts the behavior intended by the rider.

Preferably, in the controller 60, the setting section 63 sets the distribution of braking force between the braking force applied to the front wheel 3 and the braking force applied to the rear wheel 4 based on the degree of slope of the road along which the lean vehicle 100 is traveling. In this way, it is possible to stabilize the posture of the lean vehicle 100 in the pitch direction.

Preferably, in the controller 60, the setting section 63 distributes the target braking force of the lean vehicle 100 to the front wheel 3 and the rear wheel 4 at the target ratio in the EBA. In this way, it is possible to appropriately make the distribution of braking force between the braking force applied to the front wheel 3 and the braking force applied to the rear wheel 4 appropriate in the EBA.

Preferably, in the controller 60, in the EBA, the setting section 63 sets the distribution of braking force between the braking force applied to the front wheel 3 and the braking force applied to the rear wheel 4 such that the braking force on the front wheel 3 becomes the target braking force of the lean vehicle 100 and that the ratio of the braking force between the front wheel 3 and the rear wheel 4 becomes the target ratio. In this way, it is possible to appropriately make the distribution of braking force between the braking force applied to the front wheel 3 and the braking force applied to the rear wheel 4 appropriate in the EBA.

Preferably, the controller 60 operates the setting section 63 to set the adjusted braking force on the rear wheel 4 based on the magnitude relationship between the increased braking force on the front wheel 3 and the target braking force of the lean vehicle 100 in the EBA. In this way, it is possible to set the distribution of braking force between the braking force applied to the front wheel 3 and the braking force applied to the rear wheel 4 in the EBA in a manner to make maximum use of the braking force on the front wheel 3, which is mainly used for braking of the lean vehicle 100.

The present invention is not limited to the embodiment that has been described. For example, only a part of the embodiment may be implemented.

REFERENCE SIGNS LIST

1: Trunk
2: Handlebar
3: Front wheel
3a: Rotor
4: Rear wheel
4a: Rotor
10: Brake system
11: First brake control section
12: Front-wheel brake mechanism
13: Second brake control section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Front-wheel rotational frequency sensor
42: Rear-wheel rotational frequency sensor
43: Inertial measurement unit
44: Environment sensor
45: Master-cylinder pressure sensor
50: Hydraulic pressure control unit
51: Base body
60: Controller
61: Acquisition section 62: Control section 63: Setting section 100: Lean vehicle

The invention claimed is:

1. A controller (60) that controls behavior of a lean vehicle (100), the controller comprising:

a computer configured to:

perform a brake control to increase a braking force of the lean vehicle (100) based on a collision possibility that is determined in response to an output result from an environment sensor (44); and set a distribution of braking force between the braking force applied to a front wheel (3) and the braking force applied to a rear wheel (4) in the brake control, wherein the computer, in the brake control, controls the braking force applied to the front wheel (3) and the braking force applied to the rear wheel (4) based on the distribution of braking force set by the computer;

the computer sets the distribution of braking force based on posture information of the lean vehicle (100);

the posture information includes pitching angle information of the lean vehicle (100); and the computer, when a pitching angle included in the pitching angle information has a negative value, sets a target ratio of the distribution of braking force wherein the braking force applied to the rear wheel (4) is increased and the target ratio of the braking force applied to the front wheel (3) is reduced as an absolute value of the pitching angle rises.

2. The controller (60) according to claim 1, wherein the posture information includes lean angle information of the lean vehicle (100).

3. The controller (60) according to claim 1, wherein the posture information includes acceleration/deceleration information of the lean vehicle (100).

4. The controller (60) according to claim 1, wherein the computer sets the distribution of braking force based on an operation amount of the brake control.

5. The controller (60) according to claim 1, wherein the computer sets the distribution of braking force based on a degree of slope of a road along which the lean vehicle (100) is traveling.

6. The controller (60) according to claim 1, wherein the computer, in the brake control, distributes a target braking force of the lean vehicle (100) to the front wheel (3) and the rear wheel (4) at a target ratio.

7. The controller (60) according to claim 1, wherein the computer, in the brake control, sets the distribution of braking force such that the braking force applied to the front wheel (3) becomes a target braking force of the lean vehicle (100) and that a ratio between the braking force applied to the front wheel (3) and the braking force applied to the rear wheel (4) becomes a target ratio.

8. The controller (60) according to claim 1, wherein the computer, in the brake control, sets an adjusted braking force for the rear wheel (4) based on a magnitude relationship between an increased braking force on the front wheel (3) and a target braking force of the lean vehicle (100).

9. A control method for controlling behavior of a lean vehicle (100), the control method comprising:

performing, via a computer, a brake control to increase a braking force applied to the lean vehicle (100) based on a collision possibility that is determined in response to an output result from an environment sensor (44); and setting, via the computer, a distribution of braking force between the braking force applied to a front wheel (3) and the braking force applied to a rear wheel (4) in the brake control based on a maximum value of a braking force that can be generated on the front wheel and a magnitude relationship between the maximum value and a target braking force of the lean vehicle (100), wherein the computer, in the brake control, controls the braking force applied to the front wheel (3) and the braking force applied to the rear wheel (4) based on the distribution of braking force set by the computer;

the computer sets the distribution of braking force based on posture information of the lean vehicle (100);

the posture information includes pitching angle information of the lean vehicle (100); and the computer, when a pitching angle included in the pitching angle information has a negative value, sets a target ratio of the distribution of braking force wherein such that the braking force applied to the rear wheel (4) is increased and the target ratio of the braking force applied to the front wheel (3) is reduced as an absolute value of the pitching angle rises.

10. The control method of claim 9, wherein the target braking force of the lean vehicle (100) is based on an inter-vehicular distance between the lean vehicle (100) and a preceding vehicle detected by the environment sensor (44) and a relative speed of the lean vehicle (100) to the preceding vehicle.

11. A controller (60) that controls behavior of a lean vehicle (100), the controller comprising:

a computer configured to:

perform a brake control to increase a braking force of the lean vehicle (100) based on a collision possibility that is determined in response to an output result from an environment sensor (44), receive posture information of the lean vehicle (100) from an inertial measurement unit, wherein the posture information includes pitching angle information of the lean vehicle (100), set a distribution of braking force between the braking force applied to a front wheel (3) and the braking force applied to a rear wheel (4) in the brake control based on the pitching angle information included in the posture information, a maximum value of a braking force that can be generated on the front wheel, and a magnitude relationship between the maximum value and a target braking force of the lean vehicle (100), and control the braking force applied to the front wheel (3) and the braking force applied to the rear wheel (4) based on the distribution of braking force set by the computer.

* * * * *